United States Patent [19]
Campbell

[11] Patent Number: 5,180,272
[45] Date of Patent: Jan. 19, 1993

[54] DEVICE AND METHOD FOR OUTLOADING BULK MATERIALS

[75] Inventor: David R. Campbell, Salt Lake City, Utah

[73] Assignee: Cambelt International Corporation, Salt Lake City, Utah

[21] Appl. No.: 838,548

[22] Filed: Feb. 19, 1992

Related U.S. Application Data

[63] Continuation-in-part of Ser. No. 567,936, Aug. 15, 1990, Pat. No. 5,098,247.

[51] Int. Cl.$^5$ .............................. B65G 65/38
[52] U.S. Cl. ..................... 414/313; 198/518; 198/519; 414/320; 414/321; 414/326; 414/786
[58] Field of Search ............... 414/306-322, 414/325-327, 786; 198/511, 518, 519, 510.1

[56] References Cited

U.S. PATENT DOCUMENTS

| | | | |
|---|---|---|---|
| 2,763,362 | 9/1956 | Greaves | 414/310 X |
| 2,863,576 | 12/1958 | Trask, Sr. | 414/321 X |
| 2,864,655 | 12/1958 | Caron | 414/320 X |
| 3,139,995 | 7/1964 | Buschbom | 414/322 |
| 3,254,777 | 6/1966 | Vandusen | 414/320 |
| 3,456,818 | 7/1969 | Massey | 414/319 X |
| 4,286,909 | 9/1981 | Tingskog | 414/321 X |
| 4,313,705 | 2/1982 | Jackson | 414/312 |
| 4,350,467 | 9/1982 | Soros | 414/313 X |
| 5,098,247 | 3/1992 | Campbell | 414/321 X |

FOREIGN PATENT DOCUMENTS

| | | | |
|---|---|---|---|
| 1061274 | 8/1979 | Canada | 414/320 |
| 353419 | 9/1920 | Fed. Rep. of Germany | 198/519 |
| 3636006 | 5/1988 | Fed. Rep. of Germany | 414/319 |

Primary Examiner—David A. Bucci
Attorney, Agent, or Firm—Thorpe, North & Western

[57] ABSTRACT

An apparatus for removing bulk materials from a laterally enclosed storage area wherein the apparatus may be substantially buried within the bulk material (11). The apparatus includes a support column (16) mounted at a base into a support floor (25). An auger (17) is attached by an axial mount at the base of the support column for enabling rotational inclination of the auger from (i) a vertical orientation vertical orientation wherein the auger is nearly parallel with the vertical axis of the support column, (ii) through intermediate angles of inclination (54), to (iii) a substantially horizontal orientation (55) wherein the auger is adjacent to the support floor. The suspension cable (61) is coupled between the support column and auger to enable selective adjustment of auger inclination. A rotational displacement drive (35) is coupled to the support column to rotate the column about its vertical axis, along with the attached auger. A rotational drive motor (51) is mounted at a distal end of the auger. Rotation of the auger, along with revolution of the support column provide for progressive removal of conical layers of surface material with each 360 degree revolution. Continued inclination to the horizontal level enables the total volume of the storage area to be out loaded. A secondary auger (110) removes bulk material from in front of the drive motor (51).

19 Claims, 4 Drawing Sheets

DEVICE AND METHOD FOR OUTLOADING BULK MATERIALS

This application is a continuation-in-part of U.S. patent application Ser. No. 07/567,936, filed Aug. 15, 1990, now U.S. Pat. No. 5,098,247.

BACKGROUND OF THE INVENTION

1. Field of Invention

This invention relates to a material delivery/removal system for transporting grain, cement, and other dry stored materials from a storage bin, dome or other lateral enclosure. More specifically, the present invention relates to a bulk material delivery system for use with a free standing dome or shell-like storage bin.

2. Prior Art

Bulk storage of materials such as grain, cement, dry fuels and other commodities poses many problems which ultimately affect the availability of food, fuels and construction materials upon which each nation's economy depends. These problems range from storage requirements to special handling needs in material transport. The most difficult challenges typically arise when the bulk materials require both a controlled storage environment and unique handling profile during loading and unloading in storage areas.

Such materials include cement and similar bulk commodities which must be stored in a dry atmosphere. Because such materials require total enclosure for protection from the elements, convenient access for retrieval is typically limited. Although movable roofing permits direct use of scoop shovels and buckets to raise the bulk material to nearby trucks or rail cars, such facilities and methods are labor intensive and require a significant capital investment for equipment and special construction of buildings. As a consequence, industrial trends have focused on reducing the cost of storage and handling by simplifying construction of storage areas.

For example, free-standing dome structures have combined economical construction with the benefits of total enclosure. U.S. Pat. No. 3,456,818 illustrates a dome structure used for storing grains. Bulk materials are loaded within the dome through a top opening and are distributed outward by a rotating auger that drags the grain outward toward the laterally enclosing dome wall. This auger is designed to rotate along its longitudinal axis on top of the grain, as well as rotate radially around a center support post to provide redistribution of grain across the 360 degree top surface area of the grain. This dual rotation of the auger functions to maintain the auger in a "floating" configuration on top of the grain storage surface. The weight of the auger is carefully selected to enhance this floating performance as a necessary part of the system.

Outloading is accomplished by rotation of the center support post without the need for rotation of the auger about its longitudinal axis. An outlet port is formed in a floor surface below the support post and includes a subfloor auger which acts as a conveyer to transport material as it drops by gravity flow from the interior of the dome. Once the grain has reached its natural inclination of flow toward the central outlet port, the auger is activated to drag the remaining grain toward the center. Eventually, the total contents of the dome can be swept to the outlet port as the rotating auger cycles to a horizontal orientation near the floor surface.

Although the dome storage structure with transport system was invented approximately 25 years ago, it has experienced only limited commercial success. Its apparent limitation for use with bulk materials having physical properties similar to grains also inhibits its utility in other demanding storage needs such as with cement and other dry goods which are subject to greater compaction. These latter materials will naturally congeal to a rigid mass under the weight of the stored upper layers. This rigid mass is very difficult to break up and effectively blocks gravity flow of stored materials into the outlet. Because the auger assembly is designed to float on top of the grain, it has no significant influence on desired subsurface material movement.

In view of the numerous problems with the referenced dome storage system, access for movement of stored materials has generally been provided by lateral doors or openings at the base of the dome. These doors are opened and permit front-end loaders to use conventional loading techniques with scoop buckets or similar equipment to transport the materials. Unfortunately, highly compacted commodities such as cement do not readily collapse with removal of under support material. Indeed, a front-end loader may form a cavern opening of considerable size within the rigid base layer of material which could collapse without warning, causing potentially fatal results.

Such potential damage is not limited to just workers and equipment. It is well known that when a massive wall of caked material collapses within a silo or dome structure, the resultant lateral force impacting against a side dome wall could cause structural fracture. This results in loss of required structural integrity of the dome such that removal of the contained materials may also result in collapse of the total structure. In consequence of the risks associated with dome enclosures, common practice has tended toward more traditional storage construction such as silo bins, vertical wall enclosures, etc.

With respect to these traditional storage structures, a variety of inloading and outloading systems have been developed, including many utilizing an auger redistribution device. For example, U.S. Pat. No. 2,711,814 discloses an auger useful for cleaning flat bottoms of a grain tank. It operates in a manner similar to the auger system disclosed in the U.S. Pat. No. 3,456,818 above. Here again, this auger is designed for use with grain storage, and operates to substantially float on the top surface of the stored grain. Related auger transport devices have been used in silo storage systems, such as disclosed in U.S. Pat. No. 2,500,043; 3,755,918; 3,155,247 and 3,438,517. These patents are representative of a broad range of applications for the transport properties of an auger within a grain bin. Here again, these share the common feature that the auger device operates in a floating configuration at the top of the grain surface and transports materials in that configuration. The above cited patents demonstrate the common practice of placing the drive motor for the auger in a center mounted position, adjacent to a central support post or other central support structure. In most instances, this floating auger is cycled around a center axis, dragging particulate stored material toward the center of the silo for transport down a central tube or outlet to an underground conveyor.

Although the auger transport system has evidenced utility with respect to grains and other bulk materials, its principal application has been directed at surface movement of materials. Such applications suggest that such an auger system is not likely to be practical with respect to bulk materials which experience greater compaction, forming a rigid base layer. It is perhaps for this reason that much of the prior art technology utilizing an auger transport system is directed toward grains and other bulk materials which have less tendency to compact under pressure. The more flowable condition of these grains enables the outloading in conventional storage bins by mere gravity flow. The auger transport system functions primarily to redistribute bulk material toward the center of the storage bin to keep gravity flow in process throughout the outloading procedure.

OBJECTS AND SUMMARY OF THE INVENTION

It is an object of the present invention to provide an auger transport system which is capable of processing compaction materials such as cement, as well as looser materials such as grains.

It is a further object of the present invention to provide a material transport system useful within a dome structure which permits the dome structure to be completely filled, essentially burying the material transport system used in outloading.

It is a still further object of the present invention to provide an auger transport system for bulk materials stored within a lateral enclosing storage structure, wherein the transport system can service all forms of dry, particulate bulk materials.

Yet another object of the present invention is to provide a system for outloading stored bulk materials in which the outloading structure is generally buried in a vertical orientation within the bulk materials, yet is capable of processing the total quantity of stored materials within the containing structure.

These and other objects are realized in an apparatus for removing bulk from a laterally enclosed storage area, wherein the apparatus is designed to be substantially buried within the bulk material, as opposed to floating on top of such material. This apparatus includes a support column having a top end, a bottom end, and a vertical axis. A base mount is configured for attachment between the bottom end of the support column and a support floor contained within the storage area. This base mount provides a fixed vertical orientation to the support column within a central section of the storage area. First elongate transfer means is coupled at its base end to the support column for dragging particular bulk materials along its length to a dispensing outlet near the base of the support column. A distal end of the first transfer means is adapted for attachment to a first support frame, which is also characterized by a base end, distal end and intermediate support section. The support frame functions to support the first transfer means, enabling it to rotate about the support column. A first drive motor is mounted at the distal end of the first transfer means and support frame and operates to apply drive force to the first transfer means. Its mounting at the distal end of the support frame helps keep the first drive motor above a top level of the stored bulk material. Second elongate transfer means having a base end and a distal end is disposed adjacent and lateral to the first drive motor for preventing build-up of the bulk material against the first drive motor during rotation of the first support frame by dragging the bulk material along a length of the second transfer means. A second support frame is mounted on the first support frame for supporting the second transfer means during rotational movement. A second drive motor is operatively connected to the second transfer means for applying a drive force to the second transfer means. An axial mount is coupled between the base of the first support frame and the bottom end of the support column to enable rotational inclination of the first and second transfer means and support frames from (i) a vertical orientation wherein the first transfer means is nearly parallel with the vertical axis of the support column, (ii) through intermediate angles of inclination, to (iii) a substantially horizontal orientation wherein the first transfer means is adjacent to the support floor of the storage area. A variable suspension line is coupled between the support column and the first support frame to enable variable selection and adjustment of inclination by permitting rotational inclination with respect to the axial mount. A rotational displacement drive is coupled to the first support frame for rotating the first and second transfer means and support frames about the vertical axis of the support column. In a preferred embodiment, the first and second transfer means comprise augers configured for rotational movement about respective longitudinal axes.

This device is utilized in connection with a method for removal of stored bulk materials in accordance with the following enclosed storage structure in a configuration as generally set forth in the previous paragraph. The first transfer means is positioned in vertical orientation, alongside the central support column. Bulk material is loaded from above the first transfer means to at least partially bury the vertical first transfer means within the bulk material. This loading can extend to and cover the very top of the first transfer means, just below the first drive motor and second transfer means and motor attached adjacent thereto. In this condition, the full length of the first transfer means is virtually buried within the bulk material. To remove bulk material from the storage area, the drive motors on the first and second transfer means are activated after an initial gravity flow is induced to free much of the material immediately therearound. This operates to break up bulk materials along the support column, permitting some free fall of materials into an outlet below the support column in the storage in the support flooring. The first and second transfer means are then set in rotation about the support column, cutting additional compacted materials free and pulling them into the lower volume above the outlet, and preventing buildup of material in front of the first drive motor. Rotation of the first and second transfer means continues around the support column, and the transfer means and support frames are sequentially and incrementally lowered in an inclining manner away from the support column. Accordingly, continued revolution of the transfer means about the support column, with incremental lowering of the transfer means to larger angles of inclination, results in removal of successive layers of bulk material to the area of the outlet port. This system and method permit processing of both compacting and non-compacting bulk materials and facilitate the use of a simple, inexpensive outloading system which does not depend on complex suspension structures or continuous flowability of bulk materials.

Other objects and features of the present invention will become apparent to those skilled in the art, taking in view of the following detailed description of preferred embodiments, taken in combination with the accompanying drawings.

DETAILED DESCRIPTION OF THE INVENTION

Figure 1:
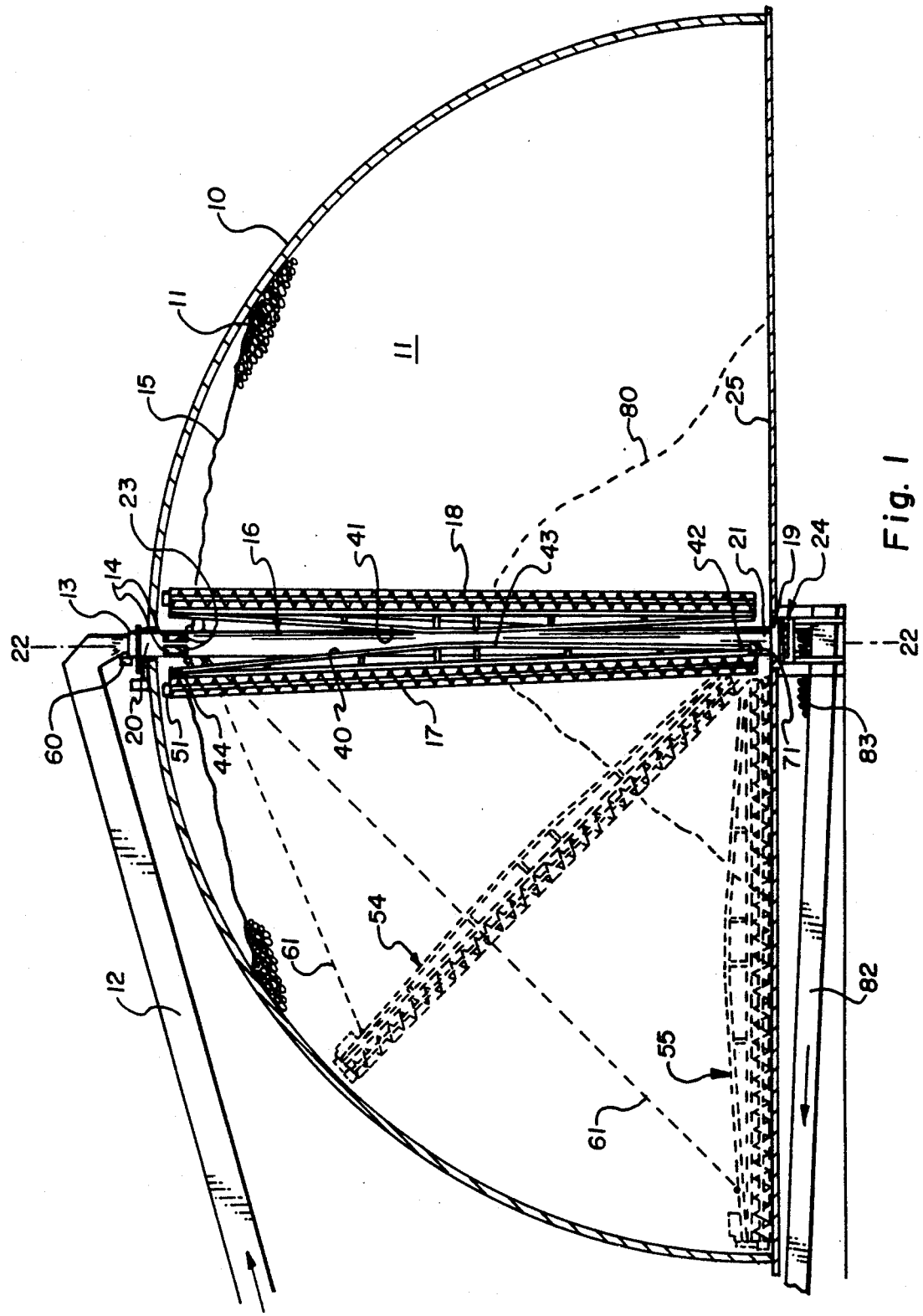
FIG. 1 shows a medial cross section of a dome storage structure utilizing an auger transport system constructed in accordance with the present invention.

FIG. 1 demonstrates an embodiment of the present invention in combination with a dome structure 10 which operates as a total enclosure for stored bulk materials 11. It will be apparent to those skilled in the art that these materials have been loaded by a conventional loading conveyor 12 through and inlet 13 at the top of the dome structure. This bulk material falls through opening 14 and spreads across the interior chamber of the dome, reaching a top level as indicated at item 15. It is plain to see that the total bulk material 11 has substantially covered a central support column 16 and attached auger transport devices 17 and 18. The transport devices 17 and 18 may alternatively comprise other transfer means known to those skilled in the art, such as bucket or paddle transfer systems.

The dome construction 10 has been illustrated with the present invention because of its particular advantage within the hemispherical dome shape wherein the auger device 17 is comparable to a radial distance throughout the contained volume of the storage area. In addition, however, the domed construction is representative of the more difficult storage problems, particularly in terms of outloading compacted materials. Accordingly, this embodiment incorporates the more stringent of the material transport conditions wherein access to the contained volumes are limited to an upper opening 13 and a lower outlet 19. It will be apparent to those skilled in the art that the same principals applied with respect to this dome structure could be applied with respect to any enclosed storage area having lateral confinement.

The apparatus of the present invention includes a support column 16 which has a top end 20, and a bottom end 21 and a vertical axis 22. The support column comprises a steel post which is hollow down its length except for a pair of deflection plates 23 which divert bulk materials transported from the loading conveyor 12 through lateral openings 14 in the support column.

This support column is vertically positioned in a base mount 24 which is attached between the bottom end of the support column 21 and a support floor 25 contained within the storage area. This base mount provides fixed vertical orientation with respect to the support column within a central section of the storage area. In the illustrated embodiment, this base mount is configured for rotational movement about the vertical axis 22.

Specifically, the base mount includes an annular converging channel or hopper 26 whose bottom end 29 defines an outlet port which disposes the bulk materials onto a conveyor belt or other transport means for carriage to a pickup location such as transport trucks or rail cars. This channeling hopper 26 is supported on a plurality of rollers or bearings 27 which ride on a support ring 28 structurally configured to bear the load of the support column 16 and its attached augers 17 and 18. The support column 16 is integrally coupled to the channelling hopper 26 with brace members 30 which are welded at the base of the support column on one side and lower portion of the hopper structure on the other side. This permits a protective flap 32 to slide along the top hopper edge 31 and protect against grain falling free of the hopper. In essence, this flap 32 operates as an angular sleeve to channel material from the storage area into the outlet 29 while the hopper is rotating in concert with the support column.

Similarly, the top end 20 is supported in a rotational configuration within the top opening 33 of the dome. As set of rollers or bearings 34 stabilize the support column 16 in vertical orientation. A drive motor 35 and chain drive 36 are coupled at the top of the support column 16 and operate as a rotational displacement means to rotate the support column about its vertical axis 22.

The respective base mount 24 and upper roller system 34 cooperate to fix the support column 16 in a sturdy, rotational configuration at a central section of the storage area. Rotation rate about the vertical axis 22 is adjusted to the outflow rate of stored material and is governed by the chain drive 36 and electric motor 35, which is housed exterior to the dome structure 10. This enables maintenance to be performed with respect t this drive system without need for access within the dome interior.

Figure 2:
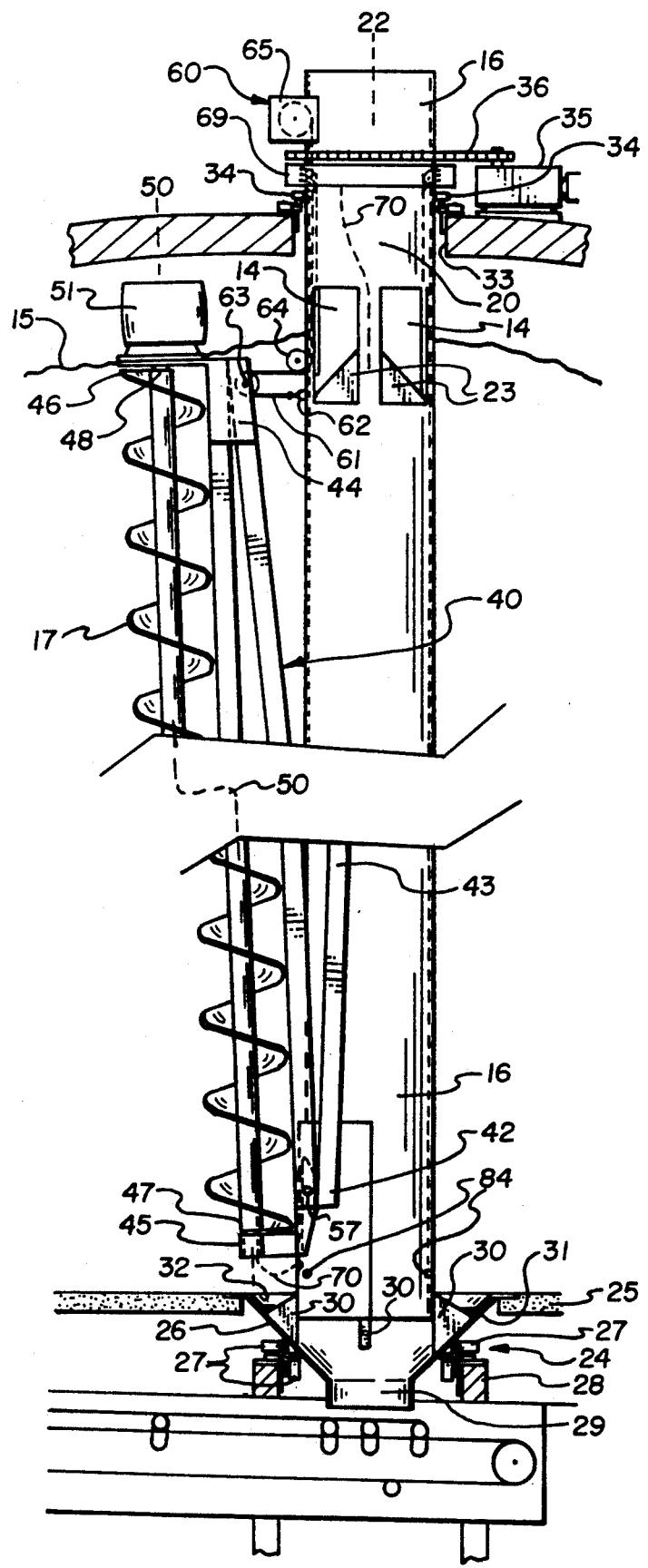
FIG. 2 illustrates a segmented partial cut-away section of the support column with attached auger in vertical orientation at one side thereof.
Figure 3:
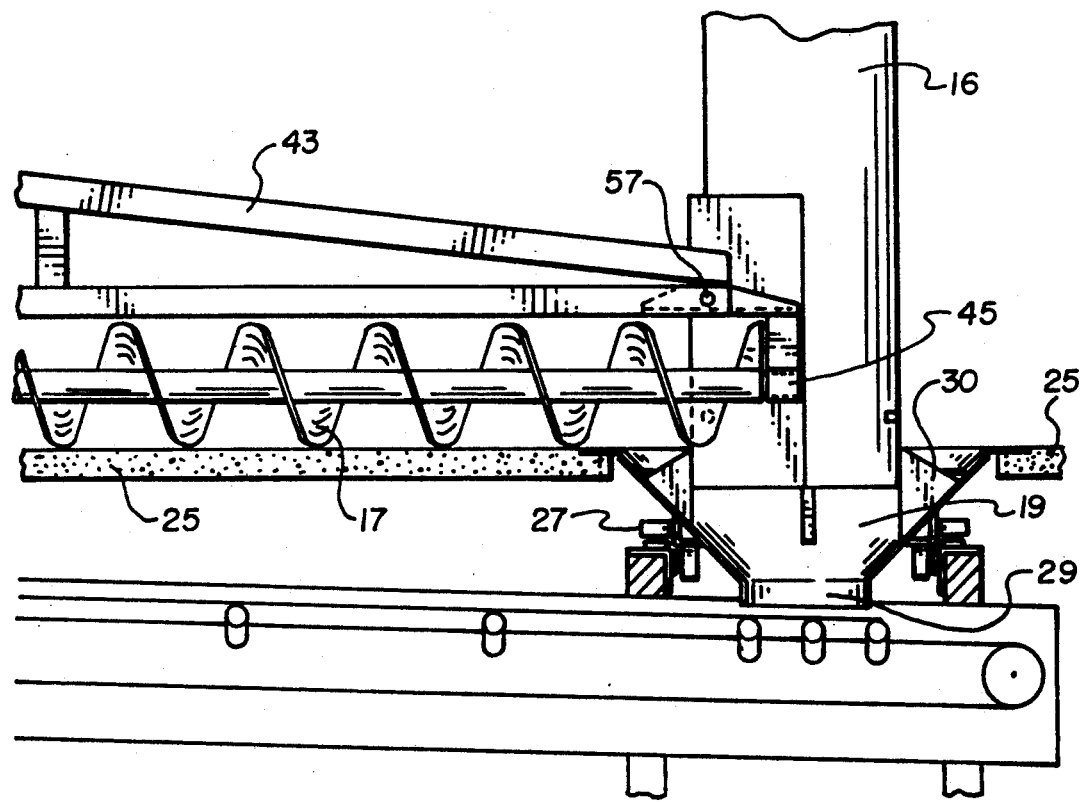
FIG. 3 shows a partial view at the base of the subject support column, with the auger transport system in horizontal, ground level position.

Attached to the support column is at least one auger support frame 40 and 41. FIG. 1 shows a support column having two such support frames and attached auger assemblies 17 and 18, further description shall be directed toward the auger configuration 17 alone. It is to be understood that a comparable description could be provided with respect to the second auger 18 which is illustrated in FIG. 1. FIGS. 2 and 3 do not include the second auger in view of its symmetrical duplicity with the disclosure relating to auger 17.

The auger support frame 40 includes a base end 42, intermediate section 43 and distal end 44. The assembled configuration of these components forms an elongate truss support span which extends from the top end 44 to the bottom end 42 and includes mounting end plates 45 and 46 with bearing mounts coupled thereto for receiving the respective base and end 47 and distal end 48 of the auger 17. This auger 17 is configured for rotational movement about its rotational axis 50 and functions to drag particulate bulk materials along the length of the auger toward the hopper 26 and dispensing outlet 27. The auger support frame 40 operates to support the auger 17 during this rotational movement and provide means for inclining the auger at varying angles as it revolves about the support column 16.

The present invention requires mounting of rotational drive motor 51 at the distal end 48 with respect to the end plate 46 on the auger support frame. This is in direct contrast with prior art trends of positioning the drive motor on auger transport systems near the support column, and at a base end of the auger. Disposition of the drive motor 51 at a distal end of the auger maintains the motor above the top level 15 of bulk material. For example, with full capacity storage as shown in FIG. 1, the drive motor 51 stands above the material level 15 by virtue of its vertical orientation. During outloading, the auger is gradually displaced in a conical revolution pattern, cutting away respectively at conical layers of bulk material. As the auger is further inclined away from the central column 16 (see phantom line examples 54 and 55), the rotational drive motor 51 is always positioned above material storage levels. This preserves life of the motor and facilitates its continuous operation to service all stages of outloading.

This is in direct contrast with prior art systems which depend primarily on free fall of the bulk materials through the outlet.

In these prior art embodiments, the auger transport system is primarily functioning to collect a remaining portion of the bulk materials left around the periphery of the floor wherein the inclination of stored materials the longer facilitates free fall of the particulate matter to the outlet. The present invention adopts a new strategy which comprehends not only the flowable grain material of prior art auger applications, but also covers materials such as cement and other highly compactable substances.

Inclination of the auger 17 is enabled by use of an axial mount 57 which couples between the base of the auger support frame 42 and a bottom end of the support column 16. This structure permits the auger support frame to rotate vertically about the axial mount 57 to enable rotation inclination of the auger and support frame from (i) a vertical orientation (solid line representation of item 17) wherein the auger is nearly parallel with the axis 22 of the support column, (ii) through intermediate angles of inclination (represented by phantom line drawing 54) to (iii) a substantially horizontal orientation (representation 55) wherein the auger is adjacent to the support floor of the storage area.

Selection of the specific inclination angle is accomplished by use of a variable suspension means 60 which is coupled between the support column and the auger support frame and enables various selection and adjustment of auger inclination by permitting rotational inclination with respect to the axial amount. Specifically, this suspension means includes the suspension cable 61 which is attached at a first point of attachment 62 near the top end of the support column. This cable is next supported on a first pulley 63 which is attached near the distal end of the auger support frame 44. This cable is further supported on a second pulley 64 which is attached to the support column between the first point of the attachment and the top end 20 of the support column. A second end of the suspension cable is coupled to a winch or other drive system 65 having a fixed location with respect to the support column.

The winch operates in a conventional manner to reel in and let out suspension cable to selectively incline the auger at a desired position. The winch operates as a control means for incrementally advancing the auger through a series of predetermined inclinations which increase in angle of inclination with respect to the support column with each successive 360 degree revolution of the auger about the vertical axis 22. It will be apparent that although only two inclined positions are reflected in FIG. 1, the variety of inclination angles is continuous from the vertical orientation shown in solid line for auger 17 through all intermediate angles to a horizontal configuration illustrated as item 55.

Electrical support for the respective components is provided by conventional wiring configurations. For example, all wiring support for the rotational drive motor 35 and winch 65 are external to the dome and enable direct access for maintenance. Electrical support to the winch and its rotatable configuration as part of the support column is provided by a slipping assembly 69. The same conductive slipping provides an electrical connection identified by dashed line 7 which extends the length of the support column and passes from the base of the support column up through a central tube opening within the auger 17 to the drive motor 51. All electrical lines are appropriately anchored and shielded to prevent wear with the anticipated patterns of movement for both the auger and the support column.

Figure 5:
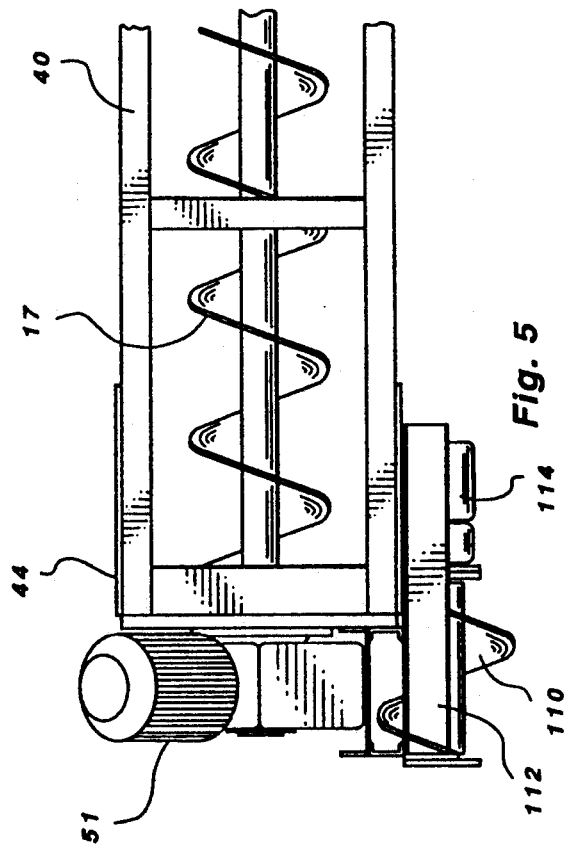
FIG. 5 is a top view of the secondary auger transport system of FIG. 4.
Figure 6:
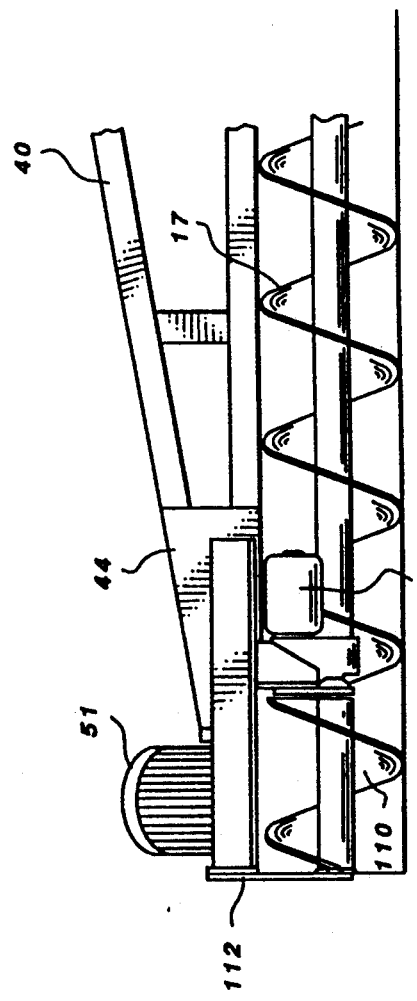
FIG. 6 is a side view of the secondary auger transport system of FIG. 4.
Figure 4:
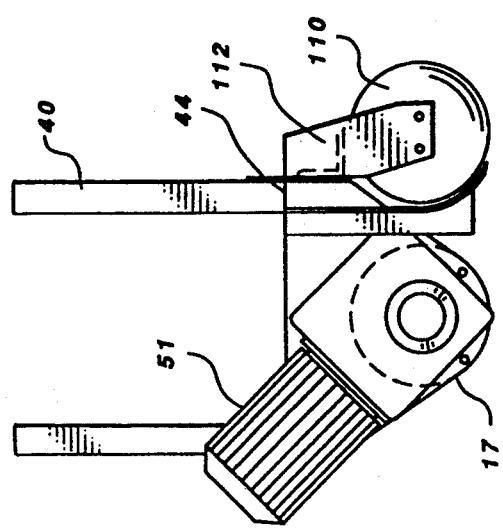
FIG. 4 is a distal end view of a secondary auger transport system for use in the invention.

Referring now to FIGS. 4 to 6, the auger 17 and support frame 40 are shown having a secondary auger 110 attached at the distal end 44 of the support frame 40, to the side of the drive motor 51. The secondary auger 110 may alternatively comprise other transfer means known to those skilled in the art, such as bucket or paddle transfer systems. The secondary auger 110 is supported by a secondary support frame 112 in which the auger 110 is rotatably mounted. The secondary support frame 112 is secured to the side of the distal end 44 of the support frame 40 by welding or other suitable means. A secondary rotational drive motor 114 is mounted to the secondary support frame 112 at the proximal or base end of the auger 110 to the support column 16, to rotatably drive the auger 110. Since the auger 110 is smaller than the auger 17, the drive motor 114 is correspondingly smaller than the motor 51.

Although the motor 51 will be maintained above the top level 15 of the bulk material under ideal conditions, in practice the motor 51 sometimes comes in contact with the material and pushes the material in front of it with no opportunity for the auger 17 to access the material and move it out of the storage dome. The material in front of the motor 51 also strains the support column drive motor 35 and causes it to operate inefficiently.

The secondary auger 110 removes material that may otherwise build up against the motor 51, and moves it down to the auger 17 for removal. The secondary motor 114 does not experience any substantial material buildup against it since the motor 114 is relatively small and allows access to the auger 17. The motor 114 has an electrical power connection through the auger assembly and support column similar to the connection powering the motor 51. To be effective, the auger 110 should be mounted to the front side of the motor 51, i.e., the side pushing against the material during rotation of the support column. Although mounting of the motor 114 on the proximal end of the secondary support frame 112 is preferred, the motor 114 may alternatively be mounted on the distal end of the support frame 112, if desired.

The unique advantages of this system of material transport within and enclosed storage area are readily apparent from the following description of methodology. Specific procedures of emplacement of the subject device within a storage area will be readily apparent from the foregoing discussion. Typical procedures would involve positioning the support column at a central location of the storage area. In a dome construction, this area would be the center point as illustrated in FIG. 1. The present invention is particularly useful in a dome configuration because the auger is capable of sweeping through the full volume of the dome from top to floor level. This permits the dome to be used to its maximum capacity in storage while taking advantage of the simplicity of inloading and outloading with a material transport system as disclosed.

Obviously, this same material transport system could be applied within a silo or cylindrical storage area, provided that the motor is maintained above the top layer of bulk material or is otherwise shielded for protection. This system could likewise be applied within an elongate storage area of rectangular configuration. In this circumstance, the material transport system illustrated in FIG. 1 might be placed on a center track or rail such that it could be moved down the track to sweep through the storage area. Other configurations will be apparent to those skilled in the art, based on the understanding provided with respect to the disclosed material transport system.

The next procedural step involves attaching the auger to the other support frame and attaching the auger support frame at the base of the support column by means of an axial amount which enables the described rotational inclination of the auger. The suspension cable is then coupled to the winch and adjustment system, and is placed in the vertical orientation. This system is now prepared for use.

Loading operations proceed with transporting bulk materials along the loading conveyor 12 and into the storage area. As bulk materials fall within the storage area, natural accumulation develops as indicated by broken line 80 in FIG. 1. Continued filling through the top opening 13 eventually results in capacity storage with a top level at solid line 15. At this stage, the auger systems are virtually buried within the accumulated materials. This storage mode and condition can continue for whatever duration of time as may be necessary.

When outloading is required, the lower conveyor 82 is activated and particulate material flow along the conveyor direction. Some gravity flow without auger assist may occur to continue to feed the conveyor particular with flowable material such as grain. With more difficult contents, compaction may have occurred, resisting gravity flow. At this point, one or both augers 40 and 41 are activated with a rotation direction toward the outlet port 19. This rotary action breaks the center column of material free around the support column and allows this material to flow by gravity into the outlet 19.

In some instances, compaction below the auger may choke particulate material from falling into the outlet. In this instance, air jets 84 are blasted to fracture such rigid materials and stimulate free flow. Particle movement is continued by activating the drive motor 35 and setting the support column 16 in rotation about its vertical axis. This rotation, with the continuing rotation of the respective augers maintains a steady flow of particulate matter toward the outlet 19.

As the accumulated product around the support column is cleared, a conical void is partially formed. The winch 60 may then be activated to let out a segment of suspension cable to lower the auger (together with its secondary auger) to operate with respect to bulk materials which are not breaking free from a compacted configuration. The weight of the auger and attached motor assist the auger in extending to the available length of suspension cable as the auger cuts through the adjacent wall of material. By repeating this procedure, sequentially lengthening the suspension cable as the auger passes through each 360 degree revolution about the support column, the total material can be evacuated despite congealment or other forms of aggregation of the stored material, and despite its location with any part of the storage volume.

There are many advantages which arise with implementation of the subject invention. Because of the simplicity of design, construction of the material transport system is economical and requires minimal maintenance. An additional advantage is its adaptability for application within a variety of containment areas involving lateral confinement. With respect to enclosing dome structures, the present invention offers a safe alternative to the prior art techniques of unloading material with front-end loaders through accessed doors which can lead not only to fatal accidents, but to destruction of the dome structure as well. It is to be understood that the foregoing description of preferred embodiments is merely by way of example and is not to be construed as limiting with respect to the following claims.

I claim:

1. An apparatus for removing bulk materials from a laterally enclosed storage area wherein the apparatus may be substantially buried within the bulk material, said apparatus comprising:

(1.1) a support column having a top end, a bottom end, and a vertical axis;

(1.2) a base mount configured for attachment between the bottom end of the support column and a support surface within a central section of the storage area;

(1.3) first elongate transfer means for dragging the bulk material along a length of the first transfer means, when buried under the bulk material, toward a dispensing outlet near the bottom end of the support column, said first transfer means having a base end and a distal end;

(1.4) a first support frame having a base end, intermediate support section, and distal end, said distal end being coupled to the distal end of the first transfer means and being adapted with means for supporting the first transfer means during rotational movement;

(1.5) a first drive motor mounted at the distal end of the first transfer means and first support frame, said first drive motor further including means to apply a drive force to the first transfer means when in a buried configuration;

(1.6) an axial mount coupled between the base of the first support frame and bottom end of the support column, said axial mount including means for enabling rotational inclination of the first transfer means and first support frame from (i) a vertical orientation wherein the first transfer means is nearly parallel with the vertical axis of the support column, (ii) through intermediate angles of inclination, to (iii) a substantially horizontal orientation wherein the first transfer means is adjacent the support floor of the storage area;

(1.7) variable suspension means coupled between the support column and the first support frame for enabling variable selection and adjustment of inclination of the first transfer means by permitting rotational inclination with respect to the axial mount;

(1.8) rotational displacement means coupled to the first support frame for rotating the first transfer means and first support frame about the vertical axis of the support column to thereby provide for progressive removal of conical layers of surface material with each successive rotation;

(1.9) second elongate transfer means having a base end and a distal end, the second transfer means being disposed adjacent and lateral to the first drive motor, for preventing build-up of the bulk material against the first drive motor during rotation of the first support frame by dragging the bulk material along a length of the second transfer means;

(1.10) a second support frame mounted on the first support frame for supporting the second transfer means during rotational movement;

(1.11) a second drive motor operatively connected to the second transfer means for applying a drive force to the second transfer means.

2. The apparatus of claim wherein the second drive motor is mounted on the second support frame at the base end of the second transfer means.

3. The apparatus of claim 1 wherein the second transfer means is shorter in length than the first transfer means and the second drive motor is smaller in size than the first drive motor, and wherein the second drive motor is disposed forwardly of the first transfer means during rotation about the vertical axis of the support column.

4. The apparatus of claim 1 wherein the second transfer means is disposed forwardly of the first transfer means during rotation about the vertical axis of the support column and wherein the second transfer means substantially prevents frontal contact of the bulk material against the first drive motor.

5. A device as defined in claim 1, wherein the rotational displacement means comprises rotational means coupled at the bottom end of the support column to enable the support column to rotate about its vertical axis, said rotational displacement means further including a drive motor for rotating the support column at a controlled rate in combination with movement of the first transfer means.

6. A device as defined in claim 1, further including:
(6.1) a dome storage structure having a top opening centrally disposed with respect to the remaining dome structure;
(6.2) a support floor formed as a flat slab with a perimeter boundary defined by base edges of the dome structure, said support floor including an outlet port centrally located within the support floor, said outlet port being coupled to a subfloor passage configured to receive bulk materials by gravity flow for subsequent conveyor delivery to an exterior pickup location;
(6.3) said support column being attached to the support floor with its vertical axis in approximate alignment with the outlet port such that bulk materials dragged by the first transfer means drop into the outlet for subsequent removal.

7. A device as defined in claim 6, wherein the top opening is slightly larger in size than a diameter of the support column, the top end of the support column extending through the opening and above a surrounding top area of the dome structure, said rotational displacement means being mounted on the surrounding top area of the dome structure adjacent the top end of the support column to impose a drive force to rotate the support column and attached first transfer means and first support frame.

8. A device as defined in claim 7, wherein the top opening further includes a rotational bearing collar coupled to the dome structure and journalled around the top end of the support column, said bottom end of the column, also including means for rotational attachment with respect to the support floor thereby securing the support column rigidly in vertical orientation with respect to the dome structure in a rotatable configuration.

9. A device as defined in claim 1, wherein the first support frame comprises an elongate truss support span extending from the distal end of the first transfer means to the opposing base end and including opposing end plates having bearing mounts which couple at the respective base and distal ends of the first transfer means.

10. A device as defined in claim 1, wherein the variable suspension means comprises a suspension cable coupled in tension between the support column and the first support frame.

11. A device as defined in claim 10, wherein the first end of the suspension cable is attached at a first point of attachment near the top end of the support column, said cable being next supported on a first pulley attached near the distal end of the first support frame, said cable being further supported on a pulley attached to the support column between the first point of attachment and the top end of the support column, a second end of the suspension cable being applied to a winch having a fixed location with respect to the support column and being operable to reel in and let out suspension cable to selectively incline the first transfer means.

12. A device as defined in claim 11, wherein the winch is mounted at a top, exterior surface of an enclosing dome structure adjacent the top end of the support column, said suspension cable extending from the winch along the support column, to the second pulley.

13. A device as defined in claim i, wherein the variable suspension means further includes control means for incrementally advancing the first transfer means through a series of predetermined inclinations to sequentially remove conical layers of bulk material symmetrically about the support column.

14. A device as defined in claim 1, further comprising compressed air jets opening at the bottom end of the support column and having a directional orientation adapted for triggering displacement of compacted bulk material upon ejection of compressed air.

15. A device as defined in claim 1, further comprising a third transfer means supported on a third support frame, said third support frame being coupled to the support column approximately along a plane defined by the first transfer means and the support column, but on an opposite side of the support column, said third support frame including an axial mount and variable suspension means having a configuration substantially similar to said first support frame, and including a rotational drive motor on the distal end of the third transfer means.

16. The apparatus of claim 1 wherein the first transfer means comprises a nontelescoping first auger of fixed length configured for rotational movement about a first longitudinal axis.

17. The apparatus of claim 1 wherein the second transfer means comprises a second auger configured for rotational movement about a second longitudinal axis.

18. A method for removing bulk materials from a laterally enclosed storage area wherein the apparatus may be substantially buried within the bulk material, said method comprising the steps of:

(18.1) positioning a support column having a top end, a bottom end, and a vertical axis at a central location of the storage area;

(18.2) securing a base mount between the bottom end of the support column and a support floor contained within the storage area, said base mount providing a fixed vertical orientation to the support column within a central section of the storage area;

(18.3) attaching to a first support frame first elongate transfer means for dragging particulate bulk materials along a length of the first transfer means toward a dispensing outlet near the base of the support column, said first transfer means having a base end and a distal end;

(18.4) attaching the first support frame at a base end thereof to the support column with an axial mount for enabling rotational inclination of the first transfer means and first support frame from (i) a vertical orientation wherein the first transfer means is nearly parallel with the vertical axis of the support column, (ii) through intermediate angles of inclinations, to (iii) a substantially horizontal orientation wherein the first transfer means is adjacent the support floor of the storage area;

(18.5) coupling a first drive motor at the distal end of the first transfer means and first support frame, said first drive motor further including means to apply a drive force to the first transfer means;

(18.6) attaching to a second support frame second elongate transfer means for dragging particulate bulk materials along a length of the second transfer means, said second transfer means having a base end and a distal end;

(18.7) attaching the second support frame to the first support frame near the distal end of the first support frame adjacent and lateral to the first drive motor;

(18.8) coupling a second drive motor to the second transfer means for driving the second transfer means;

(18.9) positioning the first transfer means in vertical orientation;

(18.10) loading the storage area with bulk material from above the first transfer means to at least partially bury the first transfer means within the bulk material;

(18.11) commencing removal of the bulk material by activating the first drive motor on the first transfer means and the second drive motor on the second transfer means, thereby initiating free fall of stored bulk materials through an outlet port in support flooring of the storage area;

(18.12) rotating the first and second transfer means about the vertical axis of the support column, the first transfer means to remove a conical volume of bulk material and the second transfer means to remove bulk material from in front of the first drive motor; and (18.13) sequentially and incrementally lowering the first and second transfer means with each successive revolution to remove successive layers of bulk material.

19. A method as defined in claim 18, comprising the additional step of breaking up initial compaction of bulk material at a base layer of storage by ejecting a sudden blast of compressed air near the bottom end of the support column.

* * * * *